Jan. 17, 1950     E. L. BOYD     2,494,741
MOWING MACHINE
Filed Feb. 6, 1947     2 Sheets-Sheet 1
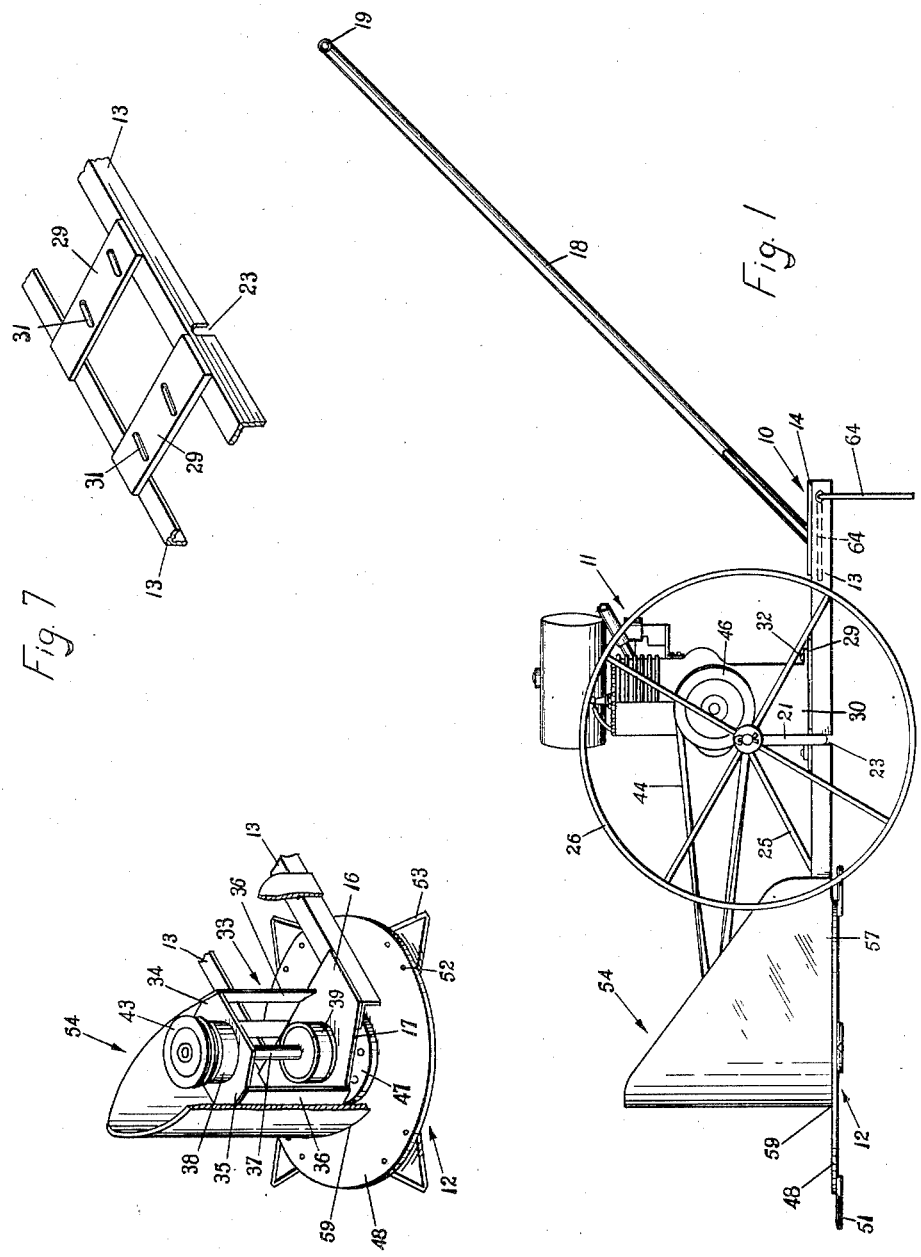
INVENTOR
Elvin L. Boyd
BY Rudolph L. Lowell
ATTY

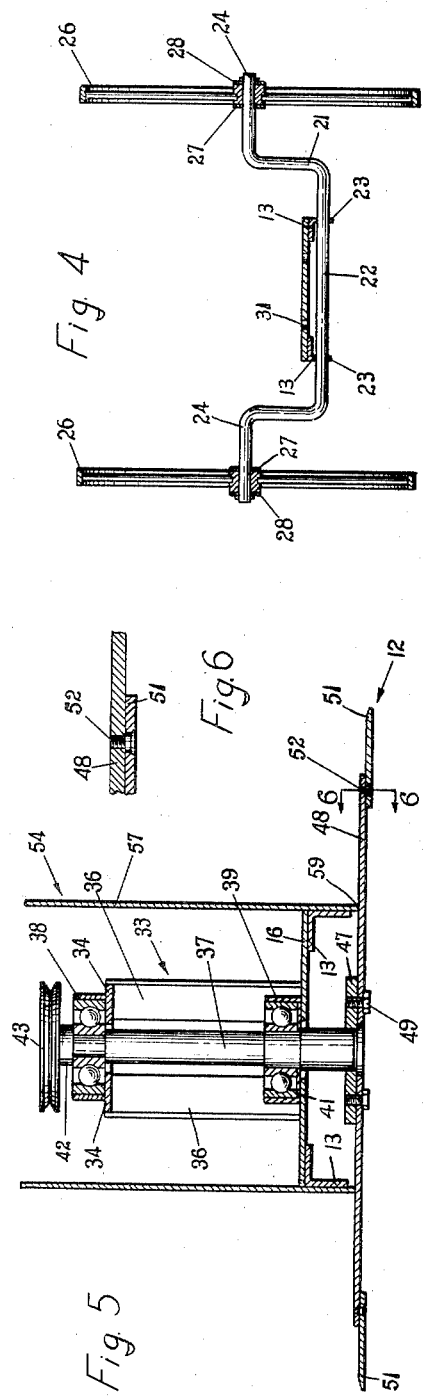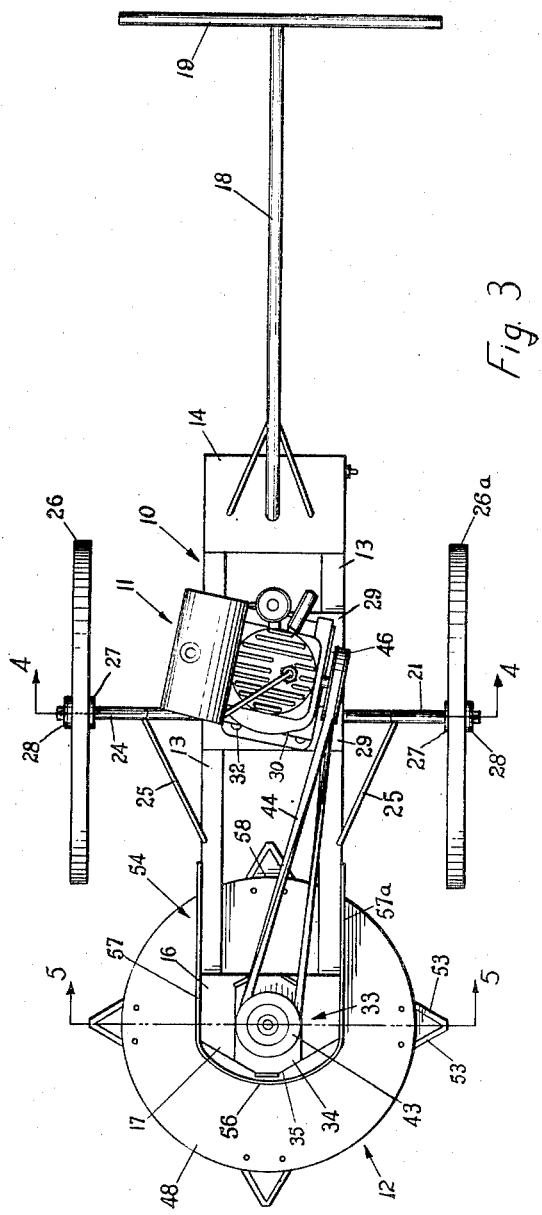

Patented Jan. 17, 1950

2,494,741

UNITED STATES PATENT OFFICE 2,494,741

MOWING MACHINE

Elvin L. Boyd, Dexter, Iowa

Application February 6, 1947, Serial No. 726,856

2 Claims. (Cl. 56—255)

1

This invention relates generally to mowing machines and in particular to a weed-cutting machine of a type which includes a two-wheel supported frame having a rotary cutter mounted on its front end for rotation in a horizontal plane at a position spaced below the frame.

Weed cutting machines of this type are generally satisfactory in operation for cutting weeds along fence lines, for trimming grass and weeds in orchards and along road ways. However, an objection to these machines is the wrapping of the cut material about the cutter shaft between the cutter and the lower bearing for the shaft, particularly under wet weather conditions. As a result the machine must be frequently stopped to remove the wound cuttings to prevent injury or permanent damage to the shaft and bearings.

It is an object of this invention, therefore, to provide an improved mowing machine.

A further object of this invention is to provide a weed cutting machine in which wrapping of the cut weeds about the cutter shaft is substantially eliminated.

Yet another object of this invention is to provide a weed cutting machine capable of operating efficiently under both dry and wet weather conditions.

Another object of this invention is to provide a mowing machine which is of a compact and light weight construction, capable of operating closely adjacent to trees, cemetery monuments and the like, economical to manufacture, and adapted to operate efficiently over a prolonged service period with a minimum of attention.

A feature of this invention is found in the provision of a mowing machine in which a horzontally rotatable cutter is equipped with a shield means adapted to prevent the wrapping of cut material about the cutter shaft.

A further feature of this invention is found in the provision of an upright shield means for a horizontally rotatable flat cutter, which is integrally formed with an arcuate front portion spaced forwardly in a concentric relation with the cutter shaft, and rearwardly extended side portions which terminate at positions substantially at the rear edge of the cutter. The lower edge of the shield means is in substantial contact engagement with the top surface of the cutter so as to eliminate the passage of cut material between the shield and the cutter.

Further objects, features and advantages of this invention will appear from the following description when taken in connection with the accompanying drawings, in which:

2

Fig. 1 is a side elevational view of the mowing machine of this invention;

Fig. 2 is a fragmentary detail perspective view showing the construction of the cutting means and its assembly relation with the main frame of the machine;

Fig. 3 is a plan top view of the machine;

Fig. 4 is a sectional view taken along the line 4—4 in Fig. 3, with the power unit removed;

Fig. 5 is an enlarged sectional view as seen on the line 5—5 in Fig. 3;

Fig. 6 is an enlarged detail sectional view taken along the line 6—6 in Fig. 5; and Fig. 7 is a fragmentary perspective view showing the frame mounting for the power unit.

With reference to the drawings, the mowing machine of this invention is illustrated in Figs. 1 and 3 as including a main or portable frame 10, a power unit 11 and a cutting unit 12. The frame 10 has a pair of longitudinal frame members 13, of an angle iron construction (Figs. 3 and 4) opened inwardly toward each other and connected across their rear ends by a brace plate 14 and across their front ends by a brace plate 16. The front side 17 of the brace plate 16 is converged forwardly and extends ahead of the main frame 10. A handle member 18 is secured at its lower end, as by welding, to the rear brace plate 14 and projects upwardly and rearwardly from the rear end of the frame 10. A hand grip or bar 19 is provided at the free end of the handle 18.

The frame 10 is carried on a wheel and axle assembly (Figs. 3 and 4) which includes an axle member 21 of a generally U-shape having a base section 22 received within oppositely arranged recesses or notches 23, formed in the frame angle members 13. The axle 21 is secured to the frame 10 by welding at the notches 23, and is suitably braced by members 25 connected between the inner ends of the shaft sections 24 and the frame members 13. Each leg of the U-shape axle 21 is bent laterally outwardly at its free end to form a shaft or axle section 24 for rotatably supporting a ground wheel 26. The ground wheels 26 are held against axial movement by the provision of fixed collar members 27 carried on the shafts 24 at positions spaced inwardly from their free ends, and by washer and cotter key assemblies 28 arranged to the outside of the wheels 26.

The power unit 11, illustrated as an engine of air-cooled type, is supported on the frame 10 at a position rearwardly of the axle member 21 (Figs. 1 and 7). A pair of engine supporting members 29, extended transversely across the frame members 13, have longitudinally extended slots 31 therein which are inclined relative to the frame members 13 for a purpose which will appear later. The engine 11 is secured to the supports 29 by the insertion of bolts 32 through the engine base 30 and the slots 31.

The front brace plate 16, on the main frame 10, constitutes the base of a bearing unit 33 for the cutting device 12 (Figs. 2 and 5). The bearing unit or cage 33 includes further a top plate member 34 which is carried on upright supports 36, shown in the drawings as three in number, and mounted on the base plate 16. The front side 35 of the top plate 34 has a contour which corresponds substantially to the contour of the front side 17 of the base plate 16, and is in substantial vertical alignment therewith.

A cutter shaft 37 is rotatably supported within the bearing cage 33 in an upper bearing member 38 supported on the top plate 34 and a lower bearing member 39 carried on the base plate 16 between the uprights 36. Mounted about the shaft 37 between the bearings 39 and the base plate 16 is a thrust washer 41. A collar member 42 is fixed on the upper end of the shaft 37 at a position above the upper bearing 38. Above the fixed collar 42 is a pulley 43 which is connected through a belt 44 with a drive pulley 46 on the engine 11 (Fig. 3).

The shaft 37 projects through the base plate 16 and is provided at its lower end with a hub or flange member 47 (Figs. 2 and 5). A flat circular body member 48, of a disc shape, is secured by cap screws 49 to the under side of the flange 47.

Thus it is seen that the disc 48 is mounted on the lower end of the shaft 37 for rotation in a substantially horizontal plane at a position below the frame members 13 of the main frame 10. Further, as clearly appears in Fig. 3, the disc 48 is of a diameter such that it extends laterally outwardly from opposite sides of the frame 10, and forwardly of the frame 10.

A series of cutters or sickle bar segments 51, of a substantially triangular shape, and illustrated in the drawings as being four in number, are arranged about the periphery of the disc member 48. The cutters 51 are flat and are secured along one of their sides to the under side of the disc member 48 by screws 52 (Figs. 2 and 6), so that cutting edges 53 thereof extend in a reversely inclined relation outwardly from the disc member 48.

In the operation of the machine the handle 18 is raised to lift the frame 10 into a substantially horizontal position, or to tilt the frame forwardly, depending upon the cutting conditions encountered. By virtue of the location of the engine 11 just rearwardly of the axle 21, the machine is counterbalanced so as to normally tilt in a rearward direction. However, this counterbalancing action is of a relatively small degree to facilitate manipulation and lifting of the machine.

By virtue of the inclined slots 31 in the engine supporting members 29, the pulley 46 is arranged in a plane which is substantially common to the axis of the pulley 43. In order to adjust the belt 44 to a proper tension, the engine 11 is movable relative to the slots, which maintain an aligned position of the pulleys 43 and 46 for all adjusted positions of the engine.

To eliminate the passage of cut material between the disc member 48 and frame 10, and to keep the cut material from wrapping about that portion of the cutter shaft 37 located between the base 16 and the disc member 48, there is provided an upright shield or guard member which is generally designated as 54 (Figs. 1, 2 and 3). The shield 54 is integrally formed with a curved front portion 56 and side portions 57 and has a lower edge 59 which lies in a common plane. The portions 57 have their top sides tapered in a downward direction away from the front portion 56, and are spaced a distance apart corresponding substantially to the width of the frame 10.

In assembly, the front section 56 is transversely arranged forwardly of the bearing cage 33 and in a concentric relation with the cutter shaft 37, so that the side sections 57 are extended rearwardly at positions against the outer sides of the frame 10.

As shown in Fig. 3, the side portions 57 are of a length such that they terminate substantially at the rear edge 58 of the disc member 48. The shield member 54 is secured to the frame 10 by welding the side portions 57 to the angle frame members 13 (Fig. 5) and is arranged relative to the cutting unit 12 such that its lower edge 59 is below the frame members 13 in substantial contact engagement with the top surface of the disc member 48.

It is seen, therefore, that the shield member 54 completely encloses the bearing cage 33, flange 47 and the front portion of the frame 10 and that its side portions 57 extend longitudinally of the frame 10 to positions substantially at the rear edge 58 of the disc member 48. A substantial contact engagement of the lower edge 59 of the shield member 54 with the disc member 48 is accomplished by virtue of the mounting of the cutters 51 to the bottom side of the disc member 48, so that the top surface of the disc 48 is entirely clear and free of any outstanding projections.

Assuming a rotation of the disc member 48 in a counter-clockwise direction, as viewed in Fig. 3, any cut material which falls on the disc member 48 is moved about the front portion 56 of the shield member 54 and against the side portion, indicated as 57a, for discharge to the ground from the rear side of the disc member. This action takes place because the substantial contact engagement between the shield member 54 and disc member 48 prevents the passage of any cut material within the confines of the shield member. As a result the shaft 37 is positively shielded or guarded from having material wrapped about its lower end. It is apparent, of course, that this same shielding action will take place for a reversed rotation of the disc 48.

In actual practice it has been found that the cutting unit 12, when rotated in a counter-clockwise direction, throws the cut material to the outside of the ground wheel, indicated as 26a in Fig. 3, so as to form a windrow of the cut material to one side of the machine. A windrow to the outside of the wheel 26 will be formed on rotation of the cutting unit 12 in an opposite direction. The cut material, therefore, is thrown clear of the path of travel of the ground wheels.

From a consideration of the above description, it is seen that the invention provides a weed-cutting machine which is of a simple and compact construction, adapted to be maintained and moved in a transport position with a minimum of effort, efficient in operation to cut material without having such material wrap about the cutter shaft, and having all of its parts readily accessible for servicing and maintenance purposes. The screws 52 (Fig. 6) for securing the cutters 51 to the disc 48 are of a reduced diameter over those portions thereof which are threadable within the disc member 48. As a result, should the cutters 51 strike an obstruction, the screws 52 will shear off at their reduced sections so as to lessen the danger of permanent injury to the cutting unit 12.

To maintain the frame 10 in a substantially horizontal position, when the machine is not being used, a pivoted support 64, provided at the rear end of the frame 10, is swingable to a ground-engaging position, as illustrated in Fig. 1. When the machine is to be used the support 64 is pivoted upwardly in a forward direction to its position illustrated in dotted lines, in Fig. 1, so as to be entirely clear of the ground.

Although the invention has been described with respect to a preferred embodiment thereof, it is to be understood that it is not to be so limited since changes can be made therein which are within the full intended scope of this invention, as defined by the appended claims.

I claim:

1. A mowing machine comprising a portable frame with longitudinal members connected by means including a brace plate at the forward ends thereof, driving means mounted on the frame, driven means operatively associated with the driving means and including a cutting disc with an upright shaft carried by bearings on said brace plate, the cutting disc being below said brace plate, and an upright shield with an arcuate front portion extending forwardly of said brace plate and with side portions extending rearwardly of the upright shaft and supported by said frame members, said shield having a lower edge substantially in contact with the cutting disc.

2. A mowing machine comprising a portable frame with longitudinal members connected by means including a brace plate at the forward ends thereof, driving means mounted on the frame, driven means operatively associated with the driving means and including a cutting disc with an upright shaft carried by bearings on said brace plate, the cutting disc below said brace place, and an upright shield with an arcuate front portion extending forwardly of said brace plate and with side portions extending rearwardly of the upright shaft and attached to the frame members so that the lower edge of said shield is positioned below the frame members, said lower edge being substantially in contact with the cutting disc.

ELVIN L. BOYD.

REFERENCES CITED

The following references are of record in the file of this patent:

UNITED STATES PATENTS

| Number | Name | Date |
| --- | --- | --- |
| 2,165,551 | Iverson | July 11, 1939 |
| 2,253,452 | Urschel | Aug. 19, 1941 |